(12) United States Patent
Kostic et al.

(10) Patent No.: US 9,807,731 B2
(45) Date of Patent: *Oct. 31, 2017

(54) COMBINED SIMULCASTING AND DEDICATED SERVICES IN A WIRELESS COMMUNICATION SYSTEM

(71) Applicant: AT&T Intellectual Property II, L.P., Atlanta, GA (US)

(72) Inventors: Zoran Kostic, Holmdel, NJ (US); Nelson Ray Sollenberger, Farmingdale, NJ (US); James F. Whitehead, Mercer Island, WA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,050

(22) Filed: Oct. 28, 2013

(65) Prior Publication Data
US 2014/0050207 A1    Feb. 20, 2014

Related U.S. Application Data

(63) Continuation of application No. 12/804,099, filed on Jul. 14, 2010, now Pat. No. 8,571,002, which is a
(Continued)

(51) Int. Cl.
*H04J 3/00* (2006.01)
*H04W 72/00* (2009.01)
(Continued)

(52) U.S. Cl.
CPC ...... *H04W 72/005* (2013.01); *H04B 7/18523* (2013.01); *H04H 20/67* (2013.01);
(Continued)

(58) Field of Classification Search
CPC .................................................... H04W 74/04
See application file for complete search history.

(56) References Cited

U.S. PATENT DOCUMENTS 5,038,403 A    8/1991 Leitch
5,485,463 A *  1/1996 Godoroja ............. 370/333
(Continued)

FOREIGN PATENT DOCUMENTS

WO          9802982 A1    1/1998
WO     WO 00/14904    *  3/2000 ............. H04B 7/266

*Primary Examiner* — Kevin C Harper
(74) *Attorney, Agent, or Firm* — Zagorin Cave LLP

(57) ABSTRACT

An efficient method for providing both dedicated and simulcast services over a common wireless infrastructure is described. The services can be available to a single terminal as well as to a multiplicity of terminals simultaneously. The method uses time division multiplexing and orthogonal frequency division multiple access for simulcasting information and transmitting dedicated message information from a plurality of base stations forming a cellular pattern over the same wireless frequency channel. The method comprises the steps of constructing frames for transmission by the plurality of base stations comprising control information, simulcast information and dedicated message information within predetermined time slots of the frames and allocating the simulcast information and the dedicated message information to time slots of the same frame predetermined by the control information of the frame. The underlying modulation technology used is OFDM and thereby the channel delay-dispersion is minimized.

19 Claims, 5 Drawing Sheets

|        | 1 FRAME                 |         |           |       |       |
|--------|-------------------------|---------|-----------|-------|-------|
| BASE 1 | CONTROL INTO            | X       | SIMULCAST | 2-WAY | 2-WAY |
| BASE 2 | X                       | CONTROL | SIMULCAST | 2-WAY | 2-WAY |
| ⋮      |                         |         |           |       |       |
| BASE N | CONTROL                 | X       | SIMULCAST | 2-WAY | 2-WAY |

TIME

Related U.S. Application Data continuation of application No. 12/321,555, filed on Jan. 22, 2009, now Pat. No. 7,787,407, which is a continuation of application No. 11/441,301, filed on May 25, 2006, now Pat. No. 7,496,062, which is a continuation of application No. 10/772,864, filed on Feb. 6, 2004, now Pat. No. 7,079,503, which is a continuation of application No. 09/753,894, filed on Jan. 3, 2001, now Pat. No. 6,885,630.

(51) Int. Cl.
| | | |
|---|---|---|
| *H04B 7/185* | (2006.01) | |
| *H04H 20/67* | (2008.01) | |
| *H04L 5/02* | (2006.01) | |
| *H04W 72/04* | (2009.01) | |
| *H04W 52/02* | (2009.01) | |
| *H04W 84/04* | (2009.01) | |

(52) U.S. Cl.
CPC ......... *H04L 5/023* (2013.01); *H04W 52/0206* (2013.01); *H04W 52/0216* (2013.01); *H04W 72/0446* (2013.01); *H04W 84/042* (2013.01); *Y02B 60/50* (2013.01)

(56) References Cited

U.S. PATENT DOCUMENTS

| | | | |
|---|---|---|---|
| 5,535,215 A | 7/1996 | Hieatt, III | |
| 5,546,443 A | 8/1996 | Raith | |
| 5,644,576 A * | 7/1997 | Bauchot et al. | ............... 370/437 |
| 5,710,765 A * | 1/1998 | Lee | ............ H04N 7/17309 |
| | | | 348/E7.07 |
| 5,802,044 A * | 9/1998 | Baum et al. | .................... 370/330 |
| 5,878,324 A | 3/1999 | Borth et al. | |
| 5,909,651 A | 6/1999 | Chander et al. | |
| 5,983,005 A | 11/1999 | Monteiro et al. | |
| 6,026,289 A | 2/2000 | Zellner et al. | |
| 6,175,550 B1 | 1/2001 | van Nee | |
| 6,445,707 B1 * | 9/2002 | Iuoras et al. | ............ 370/395.43 |
| 6,519,262 B1 | 2/2003 | Stephens et al. | |
| 6,535,552 B1 | 3/2003 | Pessao | |
| 6,574,292 B2 | 6/2003 | Heinonen | |
| 6,690,655 B1 * | 2/2004 | Miner | ................ H04L 12/12 |
| | | | 370/278 |
| 6,885,630 B2 | 4/2005 | Kostic et al. | |
| 7,068,629 B1 * | 6/2006 | Benz | ................ H04B 7/2668 |
| | | | 370/335 |
| 7,079,503 B2 | 7/2006 | Kostic et al. | |
| 7,496,062 B2 | 2/2009 | Kostic et al. | |
| 7,701,916 B2 * | 4/2010 | Dabak | ................. H04B 1/7093 |
| | | | 370/276 |
| 7,787,407 B2 | 8/2010 | Kostic et al. | |
| 8,571,002 B2 | 10/2013 | Kostic et al. | |
| 2009/0003421 A1 * | 1/2009 | Harikumar | ......... H04L 25/03012 |
| | | | 375/222 |
| 2014/0050207 A1 | 2/2014 | Kostic | |

\* cited by examiner

COMBINED SIMULCASTING AND DEDICATED SERVICES IN A WIRELESS COMMUNICATION SYSTEM

CROSS REFERENCE TO RELATED APPLICATIONS

This application is a continuation of U.S. patent application Ser. No. 12/804,099, entitled "Combined Simulcasting and Dedicated Services in a Wireless Communication System," filed Jul. 14, 2010, which is a continuation of U.S. patent application Ser. No. 12/321,555, entitled "Combined Simulcasting and Dedicated Services in a Wireless Communication System," filed on Jan. 22, 2009, now U.S. Pat. No. 7,787,407, issued Aug. 31, 2010, which is a continuation of U.S. patent application Ser. No. 11/441,301, entitled "Combined Simulcasting and Dedicated Services in a Wireless Communication System," filed on May 25, 2006, now U.S. Pat. No. 7,496,062, issued Feb. 24, 2009, which is a continuation of U.S. patent application Ser. No. 10/772,864, entitled "Combined Simulcasting and Dedicated Services in a Wireless Communication System," filed on Feb. 6, 2004, now U.S. Pat. No. 7,079,503, issued Jul. 18, 2006, which is a continuation of U.S. patent application Ser. No. 09/753,894, entitled "Combined Simulcasting and Dedicated Services in a Wireless Communication System," filed on Jan. 3, 2001, now U.S. Pat. No. 6,885,630, issued Apr. 26, 2005, which applications are incorporated herein by reference.

BACKGROUND

Field of the Invention

The invention relates broadly to the field of telecommunications and particularly to wireless telecommunication systems. More particularly, it relates to a method for efficiently and flexibly transmitting both dedicated and simulcast services over wireless systems by judicious allocation and use of physical communication channels. The technology particularly suitable for providing these services is a combination of Time Division Multiple Access (TDMA) and Orthogonal Frequency Division Multiplexing (OFDM).

Description of the Related Art

Existing wireless systems are configured either for two-way dedicated services or for broadcasting services. The two types of services use substantially different technologies and are not amenable to simple, inexpensive and efficient common network implementations.

Two-way services are dedicated communications between two stations, for example, between a base station and a single mobile subscriber station. Two-way services between two mobile subscribers must, by definition, pass through a base station so, for purposes of the present discussion, we consider only the transmission between the base station and a single mobile subscriber station, whether that communication is in one direction or two directions. Two-way services may also include, for example, interactive communication between a mobile subscriber and an Internet Web site. For purposes of the present invention, two-way communications are a subset of dedicated communications, which can be one-way or two-way but are always addressed to a single user. Current wireless mobile systems are designed to carry primarily two-way dedicated services.

Wireless broadcasting systems use fixed and inflexible channels for transmitting a single one-directional stream of information from one transmitter to numerous terminals, as opposed to the use of wireless systems. Wireless systems contain common control channels, which are operated in the broadcast mode, but this type of broadcast channel is configured to provide a minimal amount of information and is used primarily as a support for dedicated information channels. Short message service (SMS) can be carried over broadcast channels, but there are significant limitations in the length of SMS driven by physical constraints of technologies used for current generation wireless systems.

Apart from broadcast and dedicated transmission modes, certain applications can take advantage of the simulcast transmission mode. In the simulcast mode, a multiplicity of base stations transmits the same information to one or more terminals. Simulcast can be viewed as an aggregation of multiple simultaneous limited-area broadcasts from a number of base stations, or as an efficient replacement for a large area broadcast implemented within the wireless network. Simulcasting can be used for paging and high information rate distribution as well as for audio/video, e.g., digital broadcasting systems. An example of simulcast paging might be to alert volunteer emergency services personnel (e.g., volunteer firefighters) of the need to respond, rather than depending solely on the old siren. Another example of simulcasting may be an efficient distribution of stock market news by minimizing wireless resources of the wireless system.

Both current Time Division Multiple Access (TDMA) and Code Division Multiple Access (CDMA) wireless systems have broadcast control channels that have severe limitations on their use for information transmission. Traditional TDMA systems that could be redesigned based on traditional technologies to provide high information rate simulcast transmission will not be efficient. While in the soft-handoff, CDMA systems operate in a special version of the simulcast mode, where information is sent from many base stations to a single terminal, rather than information being sent from a base station (or base stations) to a multiplicity of terminals. However, providing simulcast to mobile stations outside of the soft-handoff region is not feasible with CDMA. As opposed to TDMA and CDMA technologies, the combination of TDMA with Orthogonal Frequency Division Multiplexing (OFDM), which we describe in this invention, provides a basis for highly efficient simulcasting which is very well integrated with high-speed dedicated services in a common wireless system network.

SUMMARY OF EMBODIMENTS OF THE INVENTION

The present invention provides a method for efficiently implementing both simulcasting and dedicated services within a common wireless network such that both or either type of service can be provided simultaneously to different subscriber terminals based on their individual needs.

The provision of wireless Internet service is a rapidly growing business. The Internet provides both two-way (interactive) services such as Web browsing and broadcast services such as news and entertainment services such as live concerts. Third party service providers have emerged in the market. These third party service providers transform and translate Web-based information in order to be able to forward information. This can be in the form of news or sports scores to a paging device, a wireless wireless telephone, a Personal Digital Assistant (PDA), or a combination of devices. The information may be provided directly by a provider such as Reuters or ESPN or by a third party that accesses multiple services such as Reuters and ESPN and integrates the information into a package. Because so many individuals subscribe to such a news or sports service, and because these users are widely geographically spread within a cellular network, this type of service belongs to a class of simulcast services. The information may also be provided on an alert basis such as a market watch, where a subscriber wants to be informed if a stock goes above/below a certain amount. This is usually accomplished, however, in the context of one-way service such as alerts. In either case, the information received by the subscriber is based on need and the services to which they have subscribed. The current way in which this simulcast information is distributed to the users of a cellular system is by very inefficient use of dedicated channels, such that every subscriber terminal requires one physical channel to be able to receiver the simulcast.

Existing wireless technologies provide either broadcasting services, using one (wireless broadcast) technology, or dedicated services using much different (cellular system) technologies. Furthermore, these services are provided to different types of terminals. A method by which a single network platform, based on the cellular system concept, can provide both types of services is highly desirable. The present invention provides such a method. Both services are provided by the present invention using a combination of wireless TDMA and OFDM and base station frame synchronization for both simulcasting and dedicated services.

OFDM is currently used in the context of wireless systems and broadcasting in the European Digital audio Broadcast System (DBS). Broadcasting the information in minimal amounts is supported over control channels in current cellular systems. In contrast, the present invention provides for both simulcasting and two-way service and uses the same cellular network for that purpose. Additionally, in the present invention OFDM is not used by itself but in combination with TDMA.

It is, therefore, an object of the present invention to provide mixed services (both dedicated and simulcast) over a common cellular wireless infrastructure. Simulcasting services include, but are not limited to, high-interest news, stock quotes, sports information and scores. Dedicated service includes service to a single mobile subscriber, such as phone conversations, as well as Web browsing. These services can be provided to a single terminal (mobile subscriber station) or simultaneously to a multiplicity of subscribers based on their instantaneous needs.

Further, it an object of the present invention to provide these services efficiently. That is, it is an object to minimize power consumption, system, base station and subscriber unit complexity and cost. This is accomplished by proposing the methodology that combats channel dispersion, which is one of the principal degradations that wireless systems have to combat. With these objects in mind, the present invention overcomes significant defects and drawbacks that preclude using conventional methods for providing such services.

BRIEF DESCRIPTION OF THE DRAWINGS

The invention is best described with reference to the detailed description and the following figures, where.

DETAILED DESCRIPTION

Internet services have emerged that, in some cases, are based on simulcasting as well as dedicated access. Existing wireless technologies do not efficiently support a mixture of simulcasting and dedicated access. The present invention is directed toward a method whereby a system designed using OFDM and time division multiplexing technologies supports both simulcasting and, among a group of base stations (proximate located), dedicated access with different information transmitted for each subscriber/user.

Orthogonal Frequency Division Multiplexing (OFDM) is an emerging technology for high-speed communications, which we propose to use for wireless communications in a novel and non-obvious manner. OFDM is a special form of multi-carrier modulation that uses densely spaced subcarriers (tones). The information to be communicated is split into N parallel information streams with each of the information streams modulating a different subcarrier of the OFDM carrier. In the most straightforward version of the system, all base stations use the same carrier. They share the carrier by time multiplexing (each base station getting its turn for transmission during one frame of a predefined superframe time structure). It is, however, also possible to design a system where each base station may be using only a subset of all the carriers that comprise the OFDM carrier.

Figure 4:
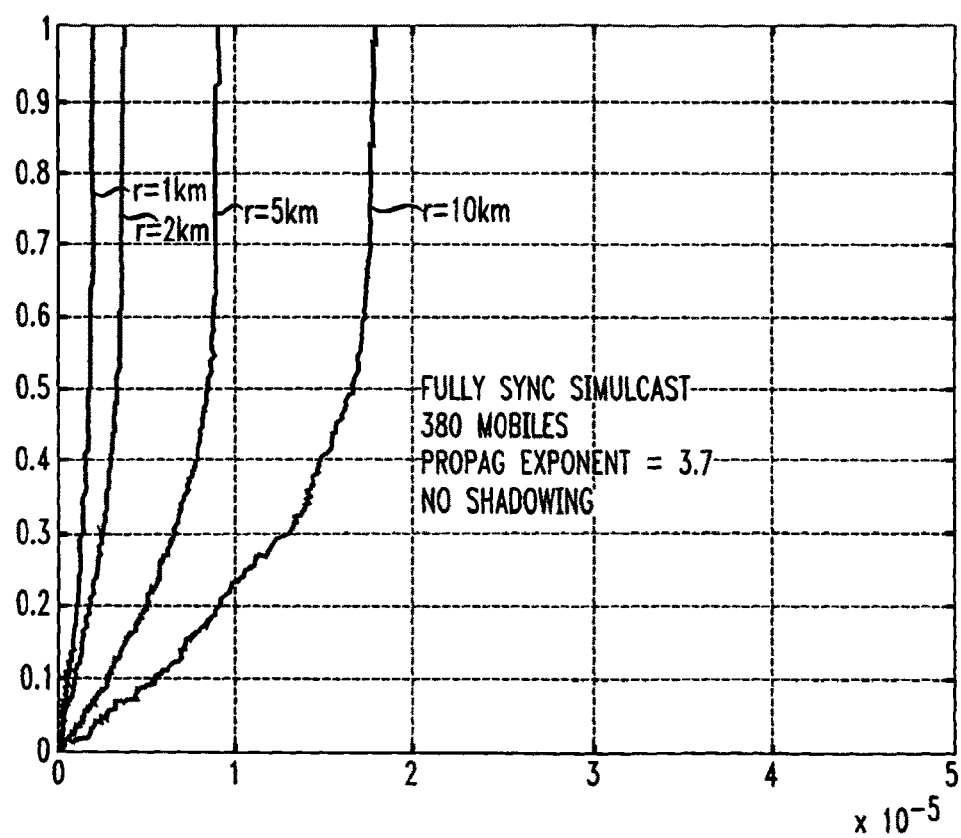
FIGS. 4-6 show the distribution for RMS delay spread illustrating the significant advantages of the hereby proposed OFDM/TDMA concept for simulcasting services.
Figure 5:
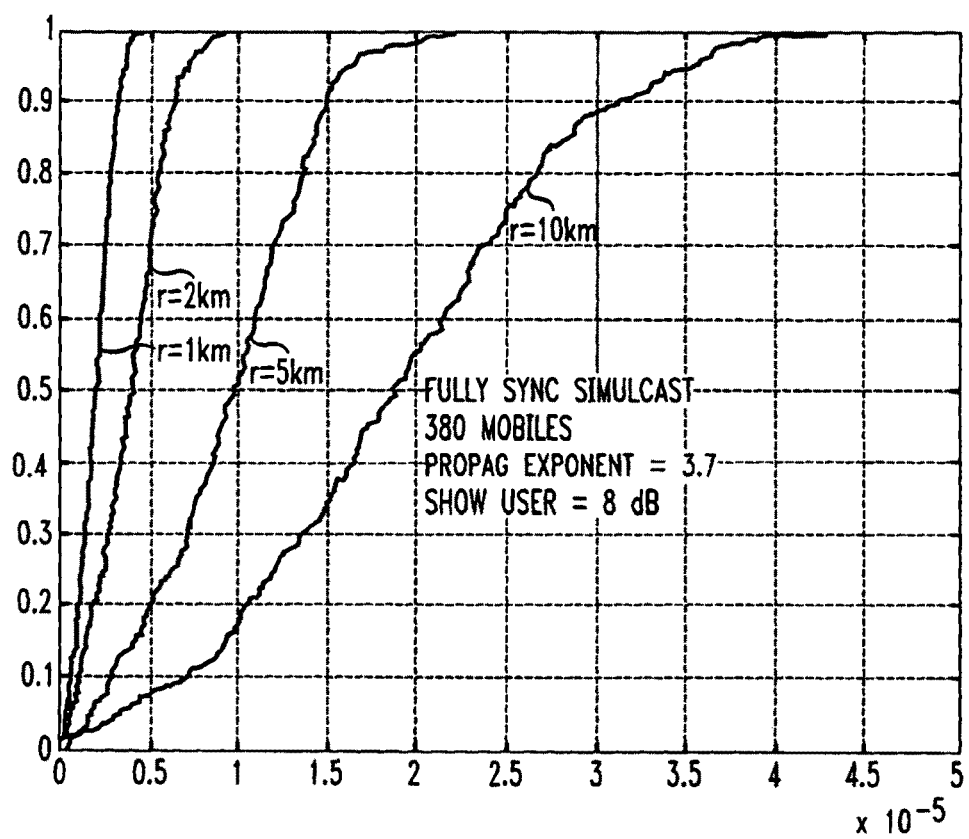
Figure 6:
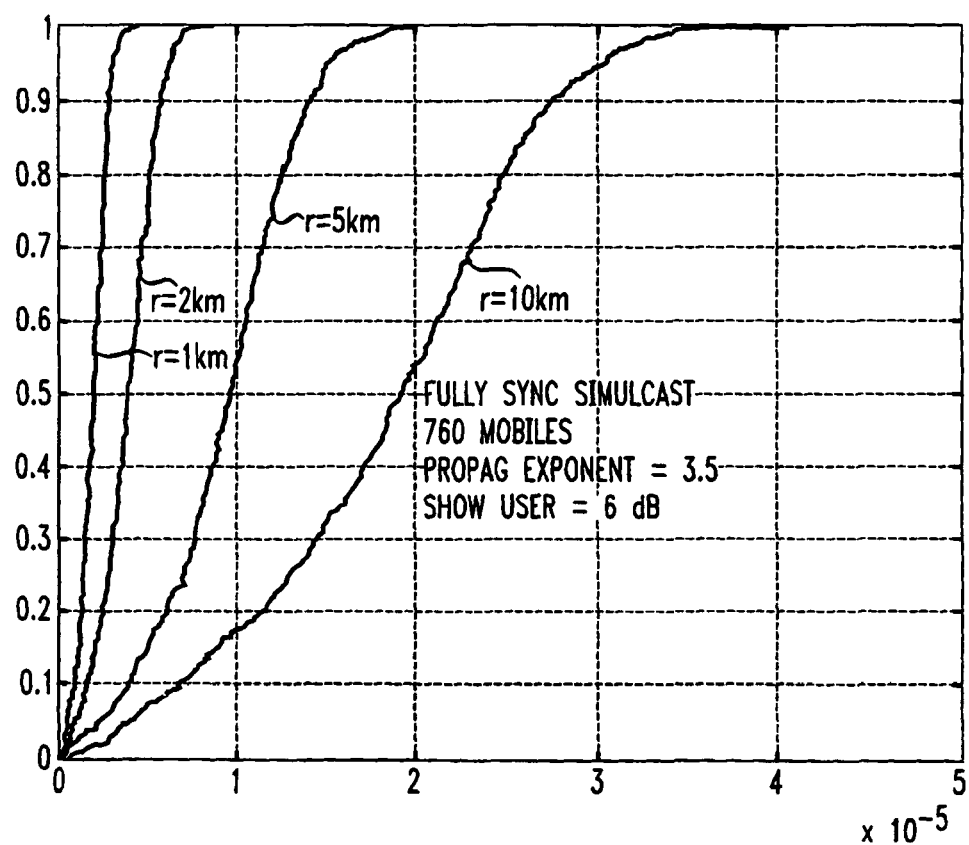

The subcarriers of a OFDM carrier are chosen to match the properties of the wireless channel, in particular to be of such bandwidth to be resistant to delay dispersion experienced by simulcasting in a cellular system. Analysis and measurements of delay spread impairments show that channel dispersion in mobile channels for dedicated transmission is generally in the 1 to 5 microseconds (μsec) RMS delay spread range. However, simulcast dispersion, where the same signal is sent from many base stations to a single terminal, is expected to be two to four times greater. This is illustrated in FIGS. 4-6, which are obtained for fully synchronized cells using omnidirectional antennas. FIG. 4 shows the distribution of the RMS delay spread for 380 mobile subscriber stations in a system with a large number of base stations. The propagation exponent is 3.7 and there is no shadowing. Four curves are plotted as a function of the cell radius—1, 2, 5 and 10 kilometers. It can be observed that the RMS delay spread reaches values up to 2, 4, 8 and 18 microseconds, respectively. This is significantly more than up to 2 microseconds that dedicated channels experience, and more than can be compensated by terminal equipment. FIG. 5 shows the distribution of the RMS delay spread for 380 mobile subscriber stations with the same propagation exponent and shadowing of 8 dB. RMS delay spread range is further extended. FIG. 6 shows the distribution of the RMS delay spread for 760 mobile subscriber stations with a propagation exponent of 3.5 and shadowing of 6 dB. Delay dispersion distribution reaches values as high as 40 microseconds. OFDM modulation is resistant to delay dispersion that is on the order of the guard times between modulation blocks and thereby particularly suitable for combating simulcast-induced dispersion illustrated in the previous figures.

Guard times allocated for dedicated services are appropriate for those services and guard times between blocks for simulcast services are appropriate for them and different from the guard times allocated for dedicated services. By way of example, using a frame of 20 msec with 20 one-msec time slots, time slots used for dedicated services might use OFDM blocks of 150 μsec in length with a 30 μsec guard time. With five such blocks in a one-msec slot, there is a 100 μsec time slot guard time. Slots used for simulcasting might operate with four blocks of 150 μsec with a 75 μsec guard time. This example allocation supports resistance to dispersion that is two to three times higher than the dedicated services mode. Based on the above example, simulcasting would support approximately 80% of the throughput of the dedicated services mode. The base stations and network would be effectively and efficiently shared by dedicated services and simulcasting services. The modulation formats would be the same. Thus, a single terminal (e.g., mobile subscriber station) could economically receive both simulcast and dedicated services.

OFDM transmission is implemented efficiently using inverse Fast Fourier Transforms (IFFT) in the transmitter and FFTs in the receiver. Each of the subcarriers or tones is part of the IFFT output. To support the sharing of the same OFDM carrier by the multiplicity of base stations, the base stations must be synchronized (which can be accomplished by the use of a Global Positioning System—GPS) and the mobile devices derive their synchronization off the wireless signals sent from the base stations. Since OFDM uses FFT operation, the complexity of its implementation is low.

The present invention uses OFDM for high-speed packet-switched or circuit-switched wireless information transmission from base stations (on a downlink) in a cellular network on a common frequency (carrier). The transmission signals from all base stations are frame synchronized in time using GPS signals or by equivalent alternate techniques. The common channel is configured in a TDMA framing manner with a frame structure containing a plurality of time slots, which may be of any duration in accordance with engineering design considerations (for example, a 20 msec frame with 20 one-msec time slots).

Combining OFDM with TDMA in the dedicated mode means that each frame carries the information for more than one subscriber, where each subscriber unit gets its information from one of the slots in the frame (in the dedicated mode). When one slot is dedicated for simulcasting services, then more than one subscriber unit gets its information from a single slot. Some time slots are used for simulcasting information from many base stations (proximately located within the frequency reuse of the system). When two or more base stations are simulcasting the (same) signal, they are simulcasting the signal using the same OFDM carrier and the same TDMA time slot. Thereby, the receiving unit can be tuned to a single OFDM carrier to receive the simulcast signals.

Figure 1:
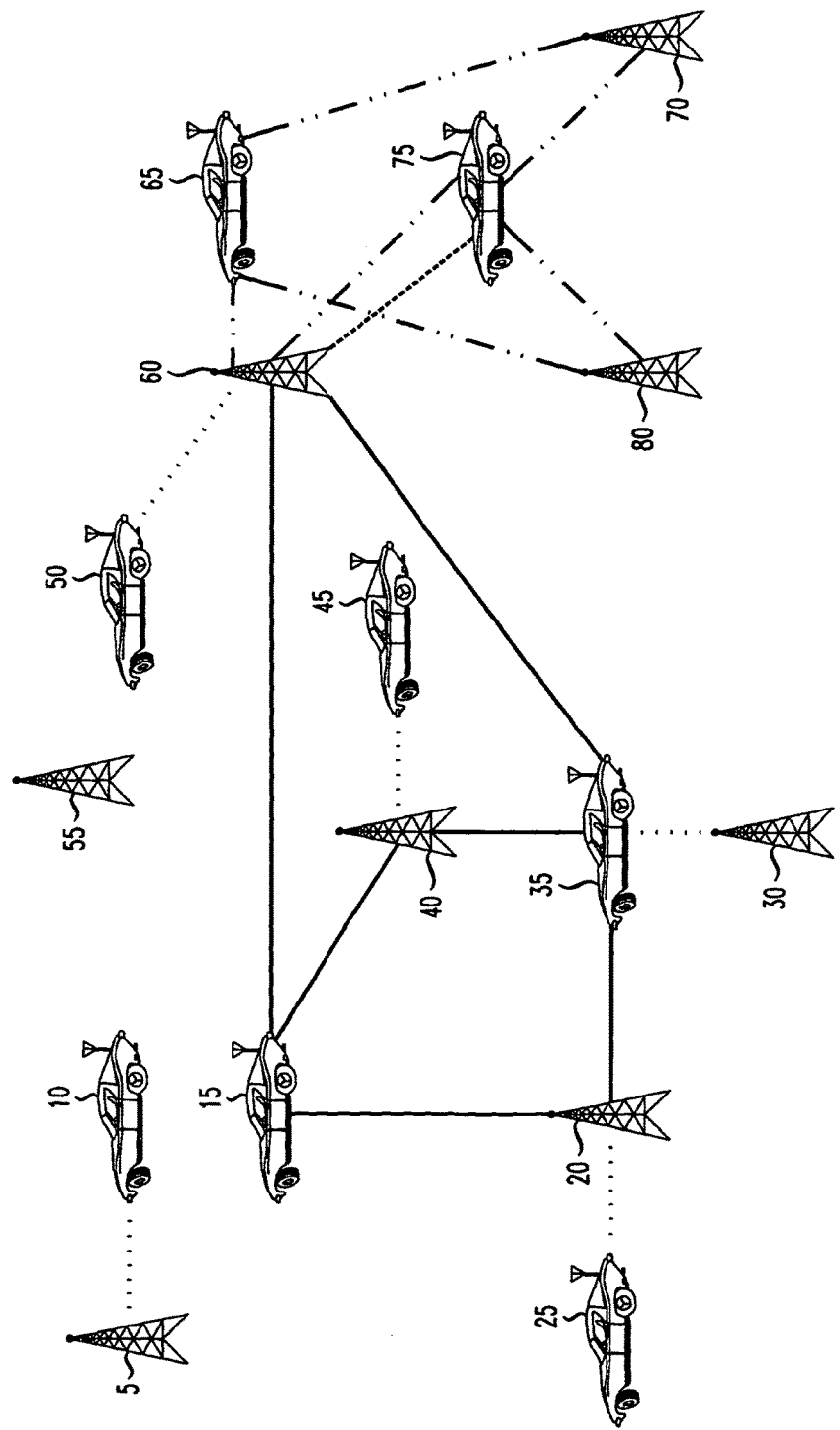
FIG. 1 illustrates an example of a cellular network that provides both dedicated channels and simulcast channels to the mobile users.

FIG. 1 illustrates an example of a cellular network that provides both dedicated channels and simulcast channels to the mobile users. Base stations 5, 20, 30, 40 and 60 are depicted transmitting dedicated information to mobile terminals 10, 25, 35, 45 and 50 respectively as indicated by the dotted lines connecting the base stations to the mobile terminals. The solid lines indicate a single (one) simulcast information transmission from three base stations (20, 40 and 60) to two mobile terminals. Mobile terminal 15 receives the simulcast transmission from base stations 20, 40 and 60. Mobile terminal 35 receives the simulcast transmission from base stations 20, 40 and 60. Mobile terminal 65 receives a simulcast transmission from base stations 60, 70 and 80 as indicated by the dashed and dotted lines connecting the base stations and the mobile terminals. Mobile terminal 75 receives the same simulcast transmission as mobile terminal 65 from the same base stations as mobile terminal 65 (60, 70 and 80). Mobile terminal 75 also receives a dedicated transmission from base station 60 as indicated by the dashed line connecting base station 60 and mobile terminal 75. To the mobile subscriber/user the dedicated transmission and the simulcast transmission may appear to be simultaneous. They are not actually simultaneous but are transmitted as described herein in the same frame.

Figure 2:
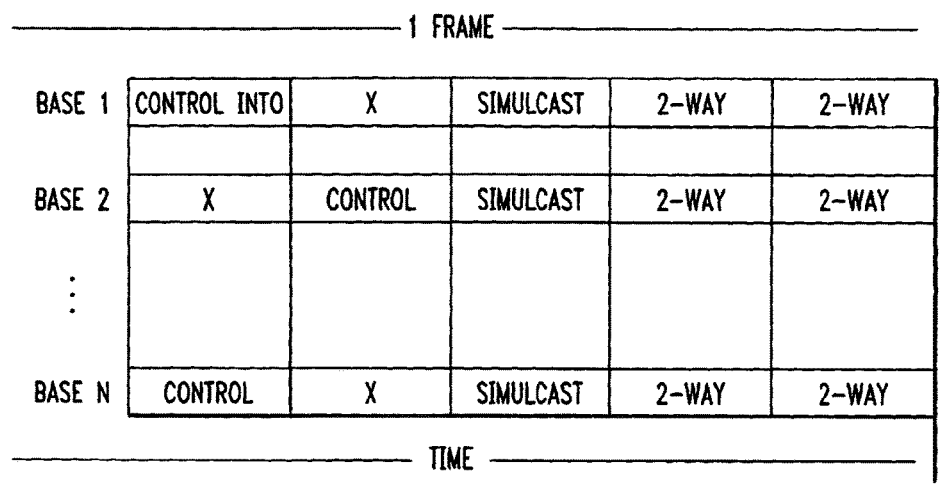
FIG. 2 depicts base stations 1 through N each sharing the same OFDM frequency (carrier), where the carrier is framed in time into time slots using time-division multiplexing.

FIG. 2 depicts base stations 1 through N each using the same OFDM carrier, with an assumption that there is only one OFDM carrier. Base stations are mutually synchronized and the signals from each of the base stations are then multiplexed onto the same carrier by using the concept of time division multiplexing using slots, frames and superframes. Each transmitting base station comprises a control processor for use in a combined OFDM and time division multiple access wireless communication system of simulcasting information and transmitting dedicated message information from a plurality of base stations forming a cellular pattern over the same wireless frequency channel, including means for constructing frames for transmission by said plurality of base stations comprising control information, simulcast information and dedicated message information within predetermined time slots of said frames and means for allocating said simulcast information and said dedicated message information to time slots of the same frame predetermined by said control information of said frame. The control processor can be a conventional central processing unit, an application specific integrated circuit (ASIC), a field programmable gate array (FPGA) or any equivalent means for performing the methods disclosed herein.

As shown in FIG. 2, a few of the time slots in each frame are reserved for control information and purposes, with neighboring/adjacent base stations using different time slots for this purpose. This is done in order to control the interference. A number of the time slots are used for simulcasting with the same information being transmitted on the simulcast time slots, same frame and superframe by all base stations using a format that mobile subscriber stations can reliably receive. The remaining time slots are used by all base stations for dedicated or individual information and can be reused some geographical distance away. That is, the time slots used for dedicated transmissions can be and are reused.

On time slots dedicated to simulcasting, OFDM blocks can be modified with longer OFDM cyclic extensions to minimize the delay dispersion (which causes multiple copies of the desired signal to be received by a mobile subscriber station, coming from several base stations with different propagation delays). Propagation delays may be the result of signals transmitted by the plurality of proximately located base stations bouncing off a plurality of buildings, mountains or other objects. Intersymbol interference is reduced by choosing an appropriate OFDM pulse length and cyclic extensions. OFDM system should be adaptive in order to support variable pulse length appropriate for reducing intersymbol interference for the wireless channel at hand. Lengthening the cycling extension reduces the capacity of a system by up to 20-30%, by way of example, but it is necessary to facilitate simulcast from a number of base stations situated at different geographical locations. Because of the redundancy built into an OFDM pulse when used for simulcasting, the original signal can be effectively and efficiently received and decoded by the present invention, even when propagation delays from different base stations are significantly different.

There are ways which could further improve the performance of the reception by using multiple antennas, but the concept of multiple antennas does not change the principal idea of the present invention.

Time slots not used for simulcasting are used for dedicated services, where the information transmitted on a single slot by each base station is directed to a single user and is different. In the case of dedicated services, a variety of techniques may be used to minimize the interference between transmissions of adjacent base stations, such as intelligent scheduling of transmissions on the available time slots, fixed reuse of resources in time such that adjacent base stations use different time slots or any other equivalent means. The use of OFDM in conjunction with TDMA, along with appropriate network structures, supports both broadcasting/simulcasting and dedicated access on one network with a shared infrastructure.

Additional options include the provision of simulcasting over a limited area (region). In limited region simulcast, some number of "close-by" base stations will perform a simulcast using a particular time slot within a given OFDM carrier. This differs from simulcast among base stations that are widely separated, which can use the same time slot at the same carrier frequency for something entirely different, such as dedicated communications. Simulcasting in widely separated base stations results in reuse of the same carrier frequencies and time slots.

Figure 3:
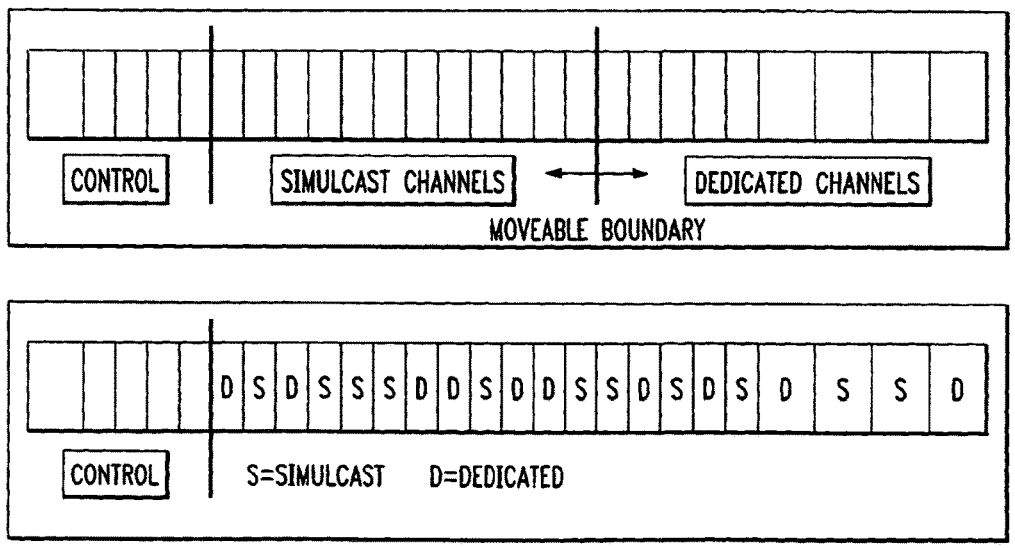
FIG. 3 shows two further concepts attendant to efficient implementation of the present invention.

FIG. 3 shows two further concepts attendant to implementation of the present invention. Both frames show the control information in the first position. The top frame illustrates the concept of movable boundaries between the simulcast blocks and the dedicated blocks. For example, assuming eight time slots per carrier and depending on the needs of the application, only one time slot may be used for simulcasting. If the application requires more bandwidth, two or more time slots may be assigned for simulcasting. This assignment may change often and dynamically using the control channel. The remaining time slots are used for dedicated transmissions.

The bottom frame suggests the concept of interspersed simulcast blocks and dedicated blocks with appropriate guard times allocated. Interspersing indicates that if more than two time slots are assigned for simulcasting, they do not have to be adjacent to each other within the TDMA frame. For example, time slots one, five and six may be used for simulcasting the same information/signal, whereas time slots two, three, four, seven and eight are used for dedicated communications.

Dedicated service blocks can be managed using any of the currently available management techniques or the equivalent. Such techniques include fixed assignment, dynamic assignment or network-assisted dynamic packet assignment.

The system described herein may be implemented in hardware, software or any combination thereof. Further, the present invention may be implemented using traditional hardware or Application Specific Integrated Circuits (ASICs) or Field Programmable Gate Arrays (FPGAs) or any combination thereof. The system may further be implemented as any combination of hardware, software, ASICs any FPGAs.

Based on the foregoing, the present invention provides a method of effectively and efficiently transmitting both dedicated and simulcast services over a common wireless infrastructure to a single terminal simultaneously. At the same time, channel dispersion is minimized.

It should be clear from the foregoing that the objectives of the invention have been met. While particular embodiments of the present invention have been described and illustrated, it should be noted that the invention is not limited thereto since modifications may be made by persons skilled in the art. The present application contemplates any and all modifications that fall within the spirit and scope of the underlying invention disclosed and claimed herein.

What is claimed is:

1. A method for use in a wireless communication system, the method comprising:
   transmitting respective frames, each of the respective frames being transmitted by a corresponding base station of a plurality of base stations, each of the respective frames containing a control information time slot, simulcast message information time slots, and dedicated message information time slots; and
   providing control information in the control information time slot, the control information identifying positions of the simulcast message information time slots and the dedicated message information time slots in the respective frames,
   wherein simulcast information in the simulcast message information time slots of each of the respective frames represents the same message information and dedicated information in the dedicated message information time slots comprises information representing message information intended for a respective single user,
   wherein the dedicated message information time slots and the simulcast message information time slots each comprise information time and guard time, the information time and the guard time each varying in duration over time, and
   wherein the control information time slot in the respective frames occurs in different reserved time slots of the respective frames of adjacent base stations of the plurality of base stations.

2. The method as recited in claim 1, wherein an allocation of the simulcast message information time slots varies over time.

3. The method as recited in claim 1, further comprising: synchronizing the plurality of base stations, the plurality of base stations being proximately located, each base station of the plurality of base stations transmitting the simulcast information using a shared orthogonal frequency division multiplexing carrier and a same time division multiple access time slot.

4. The method as recited in claim 1, wherein the simulcast message information time slots have an extended cyclic extension time as compared to dedicated message information time slots.

5. The method as recited in claim 4, wherein the extended cyclic extension time of the simulcast message information time slots comprises a guard time approximately twenty-five or higher percent as long as the simulcast message information time slots and the dedicated message information time slots comprise a guard time of less than twenty-five percent of the dedicated information.

6. The method as recited in claim 1, further comprising allocating guard time for dedicated message information time slots differently from allocating guard time for simulcast message information time slots.

7. The method as recited in claim 1, wherein the control information time slot precedes the simulcast message information time slots and the dedicated message information time slots.

8. The method as recited in claim 1, wherein the wireless communication system utilizes a combination of orthogonal frequency division multiplexing modulation and time division multiple access.

9. The method as recited in claim 1, wherein transmission of the respective frames is synchronized by the base stations.

10. The method as recited in claim 1, wherein the simulcast message information time slots in a frame of the respective frames and the dedicated message information time slots in the frame are interspersed with each other without an intervening control information time slot.

11. The method as recited in claim 10, further comprising:
synchronizing the plurality of base stations, the plurality of base stations being proximately located, each base station of the plurality of base stations transmitting the simulcast information using a shared orthogonal frequency division multiplexing carrier and a same time division multiple access time slot.

12. A method for use in a wireless communication system, the method comprising:
receiving frames, each of the frames containing a control information time slot, simulcast message information time slots, and dedicated message information time slots; and
receiving control information in the control information time slot, the control information identifying positions of the simulcast message information time slots and the dedicated message information time slots in the frames,
wherein dedicated information in the dedicated message information time slots comprises information representing message information intended for a single user,
wherein the dedicated message information time slots and the simulcast message information time slots each comprise information time and guard time, the information time and the guard time varying in duration over time, and
wherein the control information time slot occurs in a reserved time slot of a plurality of reserved time slots of the frame reserved for control information and control information received from adjacent base stations is received in different reserved time slots of the plurality of reserved time slots.

13. The method as recited in claim 12, wherein an allocation of the simulcast message information time slots varies over time.

14. The method as recited in claim 12, wherein the simulcast message information time slots in a frame of the frames and the dedicated message information time slots in the frame are interspersed with each other without an intervening control information time slot.

15. The method as recited in claim 12, wherein the simulcast message information time slots have an extended cyclic extension time as compared to dedicated message information time slots to mitigate channel dispersion.

16. The method as recited in claim 15, wherein the extended cyclic extension time of the simulcast message information time slots comprises a guard time approximately twenty-five or higher percent as long as the simulcast message information time slots and the dedicated message information time slots comprise a guard time of less than twenty-five percent of the dedicated information.

17. The method as recited in claim 12, wherein the control information time slot precedes simulcast message information time slots and dedicated message information time slots.

18. The method as recited in claim 12, wherein the wireless communication system utilizes a combination of orthogonal frequency division multiplexing modulation and time division multiple access.

19. An apparatus comprising:
a plurality of base stations, each base station of the plurality of base stations comprising a processor, the plurality of base stations being configured to transmit respective frames, each of the respective frames being transmitted by a corresponding base station of the plurality of base stations, each of the respective frames containing a control information time slot, simulcast message information time slots, and dedicated message information time slots, and further configured to provide control information in the control information time slot, the control information identifying positions of the simulcast message information time slots and the dedicated message information time slots in the respective frames,
wherein simulcast information in the simulcast message information time slots of each of the respective frames represents the same message information and dedicated information in the dedicated message information time slots comprises information representing message information intended for a respective single user,
wherein the dedicated message information time slots and the simulcast message information time slots each comprise information time and guard time, the information time and the guard time each varying in duration over time, and
wherein the control information time slot in the respective frames occurs in different reserved time slots of the respective frames of adjacent base stations of the plurality of base stations.

* * * * *